United States Patent
Paczkowski et al.

(10) Patent No.: US 12,362,421 B2
(45) Date of Patent: Jul. 15, 2025

(54) BALLISTIC RESISTANT CASE FOR RECHARGEABLE BATTERIES

(71) Applicant: Bren-Tronics, Inc., Commack, NY (US)

(72) Inventors: Henry Paczkowski, Manhasset Hills, NY (US); Peter J. Burke, East Northport, NY (US); Daniel Sha, Farmingdale, NY (US); Eugene Rudolph, Port Jefferson Station, NY (US); Alan Squillante, Kings Park, NY (US)

(73) Assignee: Bren-Tronics Defense LLC, Commack, NY (US)

( * ) Notice: Subject to any disclaimer, the term of this patent is extended or adjusted under 35 U.S.C. 154(b) by 493 days.

(21) Appl. No.: 17/756,950

(22) PCT Filed: Dec. 9, 2020

(86) PCT No.: PCT/US2020/064074
§ 371 (c)(1),
(2) Date: Jun. 6, 2022

(87) PCT Pub. No.: WO2021/150312
PCT Pub. Date: Jul. 29, 2021

(65) Prior Publication Data
US 2023/0019586 A1  Jan. 19, 2023

Related U.S. Application Data

(60) Provisional application No. 62/964,732, filed on Jan. 23, 2020.

(51) Int. Cl.
*H01M 50/242* (2021.01)
*H01M 10/613* (2014.01)
(Continued)

(52) U.S. Cl.
CPC ....... *H01M 50/242* (2021.01); *H01M 10/613* (2015.04); *H01M 10/653* (2015.04);
(Continued)

(58) Field of Classification Search
None
See application file for complete search history.

(56) References Cited

U.S. PATENT DOCUMENTS

| 4,418,127 A | 11/1983 | Shambaugh |
| 5,392,873 A | 2/1995 | Masuyama et al. |

(Continued)

FOREIGN PATENT DOCUMENTS

| EP | 2290728 A1 | 3/2011 |
| EP | 2848557 A2 | 3/2015 |

(Continued)

OTHER PUBLICATIONS

Kipp, Dale O.. (2021). <i>MatWeb Metal Material Data Sheets (MDS).</i> MatWeb, LLC.. Retrieved from <br>https://app.knovel.com/hotlink/toc/id:kpMMDS0002/matweb-metal-material/matweb-metal-material (Year: 2021).*

(Continued)

*Primary Examiner* — Brian R Ohara
*Assistant Examiner* — M. T. Leonard
(74) *Attorney, Agent, or Firm* — Keusey & Associates, P.C.

(57) ABSTRACT

A ballistic resistant case for a secondary battery having a rectangular metal case (160) with a panel (160*p*) connected to the bottom wall and the side walls to divide the internal space of the case into cell pack receiving bays (160*b*). A bus bar (170) extends from the front wall, across the top of the panel, to the rear wall. A connector (162, 170*f*, 180*a*) secures the cover (180) to the panel (160*p*) with the bus bar (170) sandwiched therebetween. The bus bar (170) reinforces a (Continued)

central portion of the cover (180) and prevents the panel (160p) and the walls from deflecting to provide ballistic protection for the cell packs (24).

20 Claims, 9 Drawing Sheets

(51) Int. Cl.
| | |
|---|---|
| *H01M 10/653* | (2014.01) |
| *H01M 50/224* | (2021.01) |
| *H01M 50/227* | (2021.01) |
| *H01M 50/231* | (2021.01) |
| *H01M 50/264* | (2021.01) |
| *H01M 50/289* | (2021.01) |
| *H01M 50/342* | (2021.01) |
| *H01M 50/505* | (2021.01) |
| *H01M 50/522* | (2021.01) |
| *H01M 50/571* | (2021.01) |
| *H01M 50/588* | (2021.01) |
| *H01M 50/591* | (2021.01) |

(52) U.S. Cl.
CPC ....... *H01M 50/224* (2021.01); *H01M 50/227* (2021.01); *H01M 50/231* (2021.01); *H01M 50/264* (2021.01); *H01M 50/289* (2021.01); *H01M 50/3425* (2021.01); *H01M 50/505* (2021.01); *H01M 50/522* (2021.01); *H01M 50/571* (2021.01); *H01M 50/588* (2021.01); *H01M 50/591* (2021.01)

(56) References Cited

U.S. PATENT DOCUMENTS

| | | | | |
|---|---|---|---|---|
| 5,879,831 | A | * | 3/1999 | Ovshinsky .......... H01M 10/345 429/158 |
| 5,968,682 | A | * | 10/1999 | Moriyama .......... H01M 50/122 429/165 |
| 8,148,843 | B2 | | 4/2012 | Sechrist |
| 8,296,036 | B2 | | 10/2012 | Matuszeski et al. |
| 8,393,427 | B2 | | 3/2013 | Rawlinson |
| 8,457,860 | B2 | | 6/2013 | Matuszeski et al. |
| 8,816,645 | B2 | | 8/2014 | Matuszeski et al. |
| 8,980,458 | B2 | | 3/2015 | Honjo et al. |
| 9,016,765 | B1 | | 4/2015 | Rawlinson |
| 9,112,377 | B2 | | 8/2015 | Sechrist |
| 9,136,558 | B2 | | 9/2015 | Peskar et al. |
| 9,140,523 | B2 | | 9/2015 | Wahlquist et al. |
| 9,561,764 | B2 | | 2/2017 | Sechrist |
| 9,597,976 | B2 | | 3/2017 | Dickinson et al. |
| 9,705,123 | B2 | | 7/2017 | Liu et al. |
| 10,270,081 | B2 | | 4/2019 | Gouzin et al. |
| 10,308,490 | B2 | | 6/2019 | Dickinson et al. |
| 2002/0155348 | A1 | | 10/2002 | Gitto |
| 2008/0254356 | A1 | | 10/2008 | Liersch et al. |
| 2011/0064997 | A1 | | 3/2011 | Peskar et al. |
| 2011/0287290 | A1 | * | 11/2011 | Byun .................. H01M 50/553 29/623.2 |
| 2011/0293998 | A1 | | 12/2011 | Sato |
| 2012/0070703 | A1 | | 3/2012 | Wahl et al. |
| 2012/0225331 | A1 | | 9/2012 | Tartaglia |
| 2013/0017422 | A1 | * | 1/2013 | Bae ..................... H01M 50/209 429/82 |
| 2015/0099163 | A1 | | 4/2015 | Kim et al. |
| 2015/0155534 | A1 | | 6/2015 | Tsutsui |
| 2015/0349389 | A1 | | 12/2015 | Kobune |
| 2016/0111693 | A1 | | 4/2016 | Reitzle et al. |
| 2016/0226114 | A1 | | 8/2016 | Hartmann |
| 2016/0372801 | A1 | * | 12/2016 | Clemente ........... H01M 50/264 |
| 2017/0214103 | A1 | * | 7/2017 | Onnerud ................ H01G 11/06 |
| 2018/0269440 | A1 | * | 9/2018 | Lee ...................... H01M 50/211 |
| 2019/0131600 | A1 | | 5/2019 | Griffin |
| 2019/0273239 | A1 | | 9/2019 | Sato |
| 2020/0227715 | A1 | * | 7/2020 | Koo .................... H01M 50/169 |

FOREIGN PATENT DOCUMENTS

| | | |
|---|---|---|
| EP | 3584876 A1 | 12/2019 |
| WO | 2020219760 A1 | 10/2020 |
| WO | 2020219992 A1 | 10/2020 |
| WO | 2020219993 A1 | 10/2020 |
| WO | 2020219996 A1 | 10/2020 |
| WO | 2020220007 A1 | 10/2020 |

OTHER PUBLICATIONS

International Search Report and Written Opinion for International Application No. PCT/US2020/064074 from ISA/US dated Mar. 12, 2021.
European Patent Office, Supplemental European Search Report for EP20916108 issued Jun. 12, 2024.
European Patent Office, Supplemental European Search Opinion for EP20916108 issued Jun. 12, 2024.
Israel Patent Office, Office Action in corresponding Patent Appln. 294828 issued on Jan. 15, 2025.

* cited by examiner

BALLISTIC RESISTANT CASE FOR RECHARGEABLE BATTERIES

BACKGROUND OF THE INVENTION

1. Field of the Invention

The invention relates to a ballistic resistant case for rechargeable batteries.

2. The Prior Art

High capacity secondary batteries are formed by packing multiple rechargeable cells into a housing. The packing configuration can occupy a large volume, inadequately protect the cells from impact shock or lead to overheating. In addition, the battery requires sophisticated electronics to balance the charge between high and low voltage cells, protect the system from over-voltage conditions, efficiently convert power for output, provide suitable smart connectors, and provide battery status indicators.

For many applications, rechargeable batteries must be able to provide continuous charge/discharge cycles at high current levels and at elevated ambient temperatures. The high energy density of Lithium-Ion (Li-Ion) batteries would be well suited for use as an accessory battery for a vehicle powered by an internal combustion engine. In the case of utility vehicles, like military transports, the accessory battery must be able to withstand high altitudes, excessive heat, submersion and ballistic threats.

One proposed solution for a military vehicle accessory battery is described in U.S. Pat. No. 9,140,523 entitled Method and Apparatus for Armor having Integrated Battery Power. Custom plates are dispersed around the vehicle having thin metal lamina that perform dual functions as ballistic protection layers and battery anodes/cathodes. While the distributed exterior configuration of the plates may address battery cooling, the large exposed surfaces would not withstand submersion in water. In addition, these plates cannot be easily replaced if the battery is damaged or reached the end of its life cycle.

Certain shields have been proposed for electric vehicles where the battery pack is mounted under the vehicle or is integrated in the vehicle undercarriage. In U.S. Pat. No. 8,393,427 entitled Vehicle Battery Pack Ballistic Shield a lightweight aluminum, composite or fiberglass panel is mounted outside the battery casing. More particularly, the panel is spaced from the bottom of the battery casing to allow battery cooling and to provide a crumple zone so that minor panel deflections do not impinge on the battery. The panel is not part of the battery casing and does not seal the battery to provide waterproofing, high altitude protection or all-surface ballistic protection. In a similar approach, U.S. Pat. No. 9,016,765 entitled Readily Replaceable EV Battery Pack Ballistic Shield provides a series of steel, aluminum or composite shields. The shields are spaced from the battery casing and configured to be readily removed for replacement if damaged.

More conventional Electric Vehicle (EV) batteries are described in U.S. Pat. No. 5,392,873 entitled Structure for Securing Batteries Used in an Electric Vehicle which has a steel box body that supports a battery pack. The battery pack has vents and fans for air cooling and is therefore not sealed or watertight. U.S. Pat. No. 8,980,458 entitled Battery Casing provides a sheet metal tray member to stiffen a resin tray member. In order to reduce weight the metal tray members are configured as ribs and do not provide ballistic resistance.

Another vehicle battery is described in U.S. Pat. No. 10,270,081 entitled Protective Battery Casing having an exterior formed from a lightweight aluminum honeycomb lined with a electrically conductive fabric formed from polyester fiber coated with nickel. In order to prevent the internal Li-Ion cells from contacting the honeycomb or fabric, additional layers of insulating wool and glass or aramid textile are provided along with an air gap surrounding the cells. These layers of insulation can reduce heat dissipation and cause overheating in the cells. Furthermore, in this vehicle battery application there is no suggestion that the battery can withstand high altitudes, submersion or ballistic threats.

Another option set forth in U.S. Patent Application Publication 2002/0155348 proposes to form a battery casing from a flame-retardant thermoplastic including a homopolymer, a copolymer and ammonium polyphosphate and optionally including a filler such as aluminum trihydrate. While this addresses battery cooling, the thermoplastic case does not provide ballistic resistance.

Present approaches use metal sparingly in battery cases to save weight and avoid shorts and as a result lack ballistic resistance.

In other instances, standard EV batteries have external protective plates but are not sealed, high altitude safe, watertight or fully ballistic resistant.

SUMMARY OF THE INVENTION

It is one object of the present invention to provide rechargeable batteries containing lithium-ion (Li-Ion) chemistry that can be safely housed within a metal case.

It is another object of the invention to provide a ballistic resistant case for a battery.

It is a further object to provide a secondary battery capable of high amperage cycling.

It is another object to provide a rechargeable battery that is suitable for use as a motor vehicle accessory battery.

It is a further object to provide a sealed battery casing that is waterproof and safe for high altitudes.

It is another object to provide a sealed battery case with pressure relief venting.

It is a further object to provide a robust case which can contain burning cells and prevent the cells or other internal battery components from ejecting as secondary projectiles.

It is another object to provide a metal battery case to increase the dissipation of battery cell heat to the exterior of the battery case.

These and other related objects are achieved by an embodiment of the invention featuring an apparatus for electronically controlling and mechanically coupling cells together within a battery housing. Many cylindrical cells are provided having a positive contact on one circular end and a negative contact on the other circular end. The cells are held between two end frames each having a plurality of cell-receiving cups arranged in rows. Adjacent rows are staggered from each other by approximately one-half of the cell diameter so that said cells are retained within the end frames in a honeycomb configuration to form a cell pack. Each cell-receiving cup has an annular ring capped on one end with a circular bottom having an aperture therethrough. Connecting tabs extend across adjacent cups on the exterior of the cell pack. The connecting tabs are electrically soldered to cells through said apertures to sandwich the end frames between said cells and the connecting tabs. An electronic switch and control circuit including an LC resonant converter are disposed within the housing. The LC resonant converter maintains all cells at the same potential voltage and state of charge.

Each end frame includes an internal side facing the cells and including the cell-receiving cups, and an opposed external side with shallow channels for receiving the connecting tabs. The connecting tabs extend from one cup to another, coupling the corresponding cells from positive contact to negative contact, wiring the cells in series. The cell packs are then connected in parallel. The internal side of said end frame includes support posts extending off of the annular rings with tapered ends that align the cell within the cell-receiving cup. The support posts are disposed between selected groups of three adjacent cell-receiving cups. Some of said support posts have a triangular cross-sectional shape with the three sides being concave with a curvature matching the cylindrical cells.

Thermal fuses are electrically connected to the cells which blow under excessive currents. Potting compound surrounds the thermal fuses and part of the connection to the cells to insulate the thermal fuses from heat generated from normal cell operation.

The apparatus further includes isolation mounts and five-sided pockets. Each end frame includes slots along its periphery which have a height approximately equal to the height of the annular rings. Tabs on the isolation mounts are installed in the slots, with extending feet to absorb shock and vibration by distancing the cell pack from the internal surfaces of the five-sided pocket when the cell pack is contained within it to form a pocketed cell pack.

The apparatus further includes a tray cover attached to the battery housing and forming the sixth side of said five-sided pockets. On the top side of the cell pack the isolation mounts distance the cell pack from the bottom surface of the tray cover. A negative bus bar, a positive bus bar, the electronic switch and the control circuit are disposed within the tray.

Each cell pack includes one set of connecting tabs that electrically terminate in a negative cell pack terminal and another set of connecting tabs that electrically terminate in a positive cell pack terminal. The pocketed cell packs are arranged within the battery housing so that the negative cell pack terminals are located in the middle of the battery housing and the positive cell pack terminals are at the edge of the battery housing. The negative bus bar is located in the middle of the tray cover directly above, and in electrical connection with, the negative cell pack terminals. The positive bus bar is a continuous rectangular metal frame disposed around the edge of the tray cover directly above, and in electrical connection with, the said positive cell pack terminals. The continuous rectangular metal frame structurally supports the tray cover around its periphery where it is bonded to the battery housing.

While various cells may be used, the apparatus according to the invention is particularly suited for use with Lithium-Ion (Li-Ion) cells. A strip heater is intertwined between the cells in the separation formed by said honeycomb configuration to warm the cells if the ambient temperature is below the specified operating temperature of the cells.

The apparatus further includes a visual display mounted to the exterior of the battery housing, for example the tray or other external cover. The display is coupled to the smart bus or control circuit to indicate the battery state of charge. The control circuit further includes a thermal protection system having a thermistor to sense battery temperature and output temperature data. A microprocessor is coupled to the thermistor for sampling the temperature data, digitally filtering the samples to generate several parameters, and collectively analyzing the parameters to determine the sample validity.

In a further embodiment, a thermal management system for secondary batteries is provided by a combination of features including a metal case, a thermoplastic film lining the entire interior of the metal case, a cell pack made from individual cells disposed in the metal case, and a thermally conductive filler material occupying the interstices between the individual cells and between the cell pack and the thermoplastic film lining. The thermally conductive filler material decreases the thermal impedance from the cell pack to the outside surface of the metal case to reduce cell pack temperature and increase battery life.

The metal case is made from iron/carbon steel, for example, high temperature steel. It is a five-sided box, treated for rust prevention, environmental protection and includes a cover with thermoplastic film lining. The case includes pressure relief venting. The thermoplastic film is polyester, nylon, polycarbonate, or similar material. The thermoplastic film is between 0.2 mm and 2.0 mm thick, for example, 0.5 mm thick. The cell pack includes dozens of cells, and may include multiple cell packs. The filler is granular with a particle size between 2-200 microns. The filler is Alumina Trihydrate which decomposes at 220 degrees C. to release 35% of its weight as water vapor. Excessive water vapor pressure will breach the pressure relief vent.

In a further embodiment a ballistic resistant case for secondary batteries is provided by a ballistic resistant case for a secondary battery including a rectangular metal case with a front wall and two side walls and a rear wall extending up from a bottom wall. One or more panels are connected to the bottom wall and the side walls to divide the internal space of the case into two or more cell pack receiving bays. A cover is provided as the top wall to seal the cell pack receiving bays within the case. A bus bar extends from the front wall, across the top of the panel, to the rear wall. A connector secures the cover to the panel with the bus bar sandwiched therebetween, whereby the bus bar reinforces a central portion of the cover and prevents the panel and the walls from deflecting to provide ballistic protection for the cell packs.

The connector includes one or more bolts and threaded sleeves that extend through a hole formed in the bus bar, and wherein the panel is shorter than the walls by a distance that is about the height of the bus bar. The bus bar includes a front and rear surface which contact with the front and rear walls, respectively. The bus bar is made primarily from aluminum and electrically couples all of the cell pack terminals of one polarity together. The bus bar has sufficient cross-sectional area around the hole containing the threaded sleeve to conduct at least 80 amps across its length, with the corresponding heat being dissipated through contact to the cover. The connector includes a stud having an upper threaded portion and a lower portion fixedly mounted at a central point along the top of the panel. An insulating bushing is located within the bus bar hole to prevent shorting between the bus bar and any portion of the connector.

The metal case is made from iron/carbon steel or high temperature steel, with all surfaces being galvanized for rust prevention. Alternatively, all surfaces of the case are covered in a highly-crosslinked non-porous coating that protects the metal from biological, radioactive and chemical contamination and withstands chemical cleaning and decontamination without corroding. The highly-crosslinked non-porous coating comprises one of urethane, polyurethane, aliphatic polyurethane, epoxy, epoxy polyamide, epoxy polyamide enamel and combinations thereof.

All of the surfaces facing the cell pack receiving bays are lined with an electrically insulating material which serves to prevent any of the cell pack leads, connectors or control electronics from shorting to the metal case. The electrically insulating material comprises a thermoplastic film adhered to the surfaces. The thermoplastic film is one of polyester, nylon and polycarbonate, preferably polyester having a thickness between 0.2 and 2.0 mm thick, preferably 0.5 mm thick. The metal case is made from high temperature steel which withstands temperatures of at least 500 degrees C. (930 degrees F.) containing a majority of nickel, iron, cobalt and combinations thereof.

The cover is sealed to the top end of the walls with glue to provide a waterproof case that protects the cell packs from moisture intrusion. The case includes a pressure relief vent. The side portions of the cover parallel to the bus bar are adapted to pivot upwardly breaking the glue seal to provide over-pressure protection venting following ballistic impact. The pressure relief vent includes a vent hole formed in the case with a label adhered over the vent; wherein the adhered label can withstand up to 10 times variation in atmospheric pressure as encountered during altitude changes up to 15,000 meters (50,000 feet) and will rupture at greater than 10 times atmospheric pressure. A pressure sensor monitors internal pressure and is coupled to software to open circuit breakers and disconnect the bus bars at greater than 10 times atmospheric pressure. The cell pack includes individual cells arranged within end frames. The case contains a thermally conductive filler material occupying the interstices between the individual cells and between the cell pack and the thermoplastic film lining. The thermally conductive filler material decreases the thermal impedance from the cell pack to the outside surface of the metal case to reduce cell pack temperature and increase battery life. The thermally conductive filler is granular with a particle size between 2-200 microns, wherein the filler is Alumina Trihydrate which endothermically decomposes at 220 degrees C. (430 degrees F.) to release 35% of its weight as water vapor; wherein excessive water vapor pressure will breach the pressure relief vent.

Tabs extend outwardly from the end frames to space the cell packs from the case. A silicon-based shock absorbing material is selectively placed between the end frames and the metal case to stabilize the cell packs. The case is made from high temperature steel of a sufficient thickness to absorb ballistic incursion and remain intact while damaged cells burn out and ignite neighboring cells in a domino effect and simultaneously prevent the cells or other internal battery components from ejecting as secondary projectiles.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF THE PREFERRED EMBODIMENTS

Figure 1A:
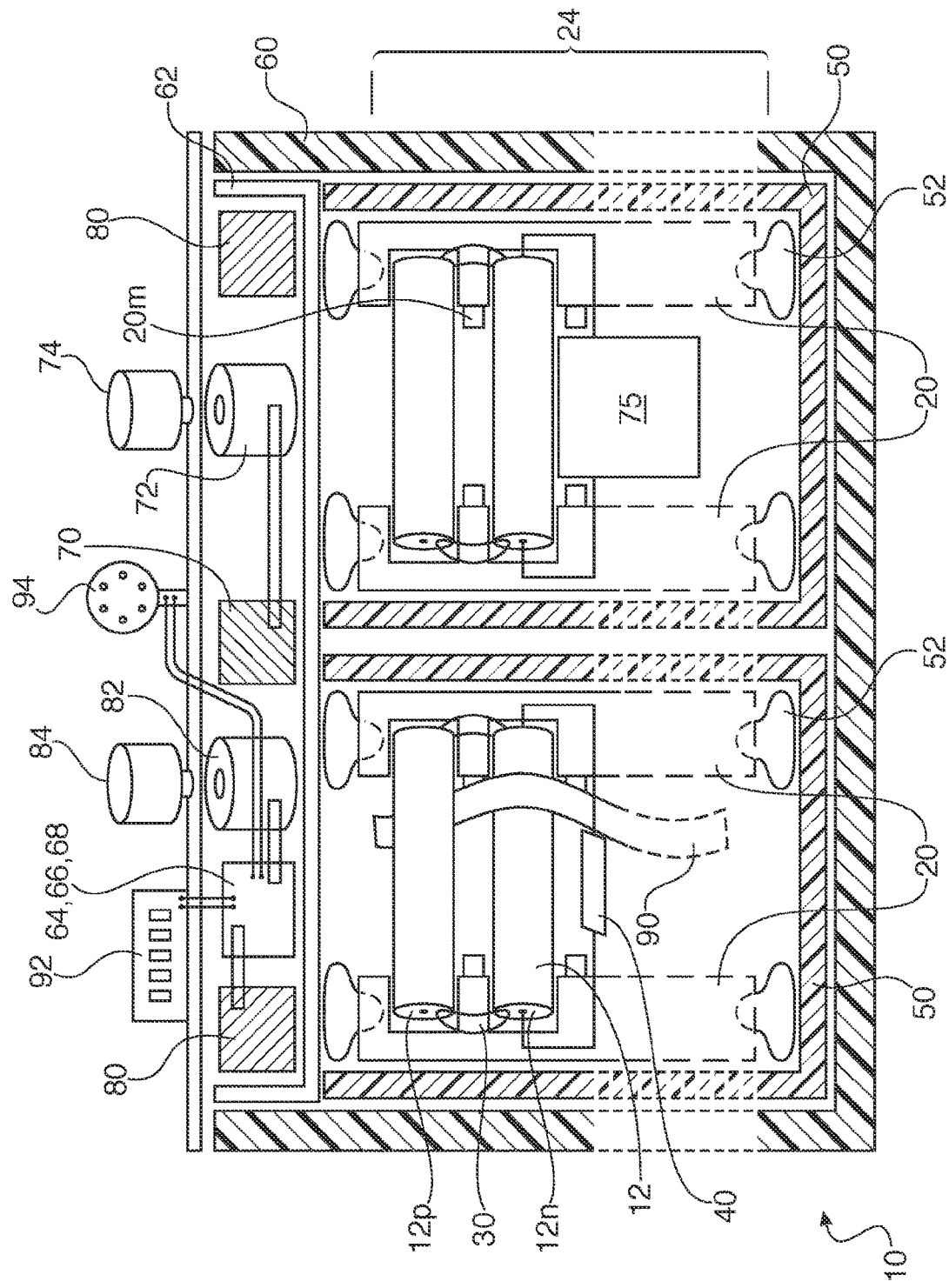
FIG. 1A is an internal view of the battery showing the cells within end frames disposed within pockets inside the housing.

The invention relates to the assembly of cell packs into a housing with integrated control electronics to form a rechargeable battery. The battery, for example, a Lithium-Ion (Li-Ion) Battery, may be useful for vehicle and other high capacity applications. In this application "secondary" batteries have the same meaning as "rechargeable" batteries.

The arrangement of cells is critical to facilitate the assembly process. The series and parallel arrangements of cells are often inefficient to connect in an economical and functional arrangement. The assembly is shown in FIG. 1A as an apparatus 10 for electronically controlling and mechanically coupling cells together within a battery housing 60.

The 18650 cells are arranged into six cell packs. Two cell packs 24 are shown, in a first row, where two additional rows may by added behind the two cell packs shown. The cell packs are then tied in parallel with substantial bus bars. The construction of the cell packs uses two symmetrical honeycomb shaped parts to hold each end of the cylindrical cells (49 cells for 24 v and 48 cells for 12 v). The cells 12 and honeycombs, illustrated as end frames 30 get press-fitted and held together by friction fit. The end frame has alignment feature that gradually spread & align all cells at the same time as press-fit process takes place. The honeycomb part holds the cells in relation to each other so as to provide a gap between cells of sufficient size to improve safety by slowing heat conduction from a failed cell and adjacent cells. The gap is also sufficient to allow a strip heater 90 to be snaked between cells providing direct heat to each cell.

Figure 1B:
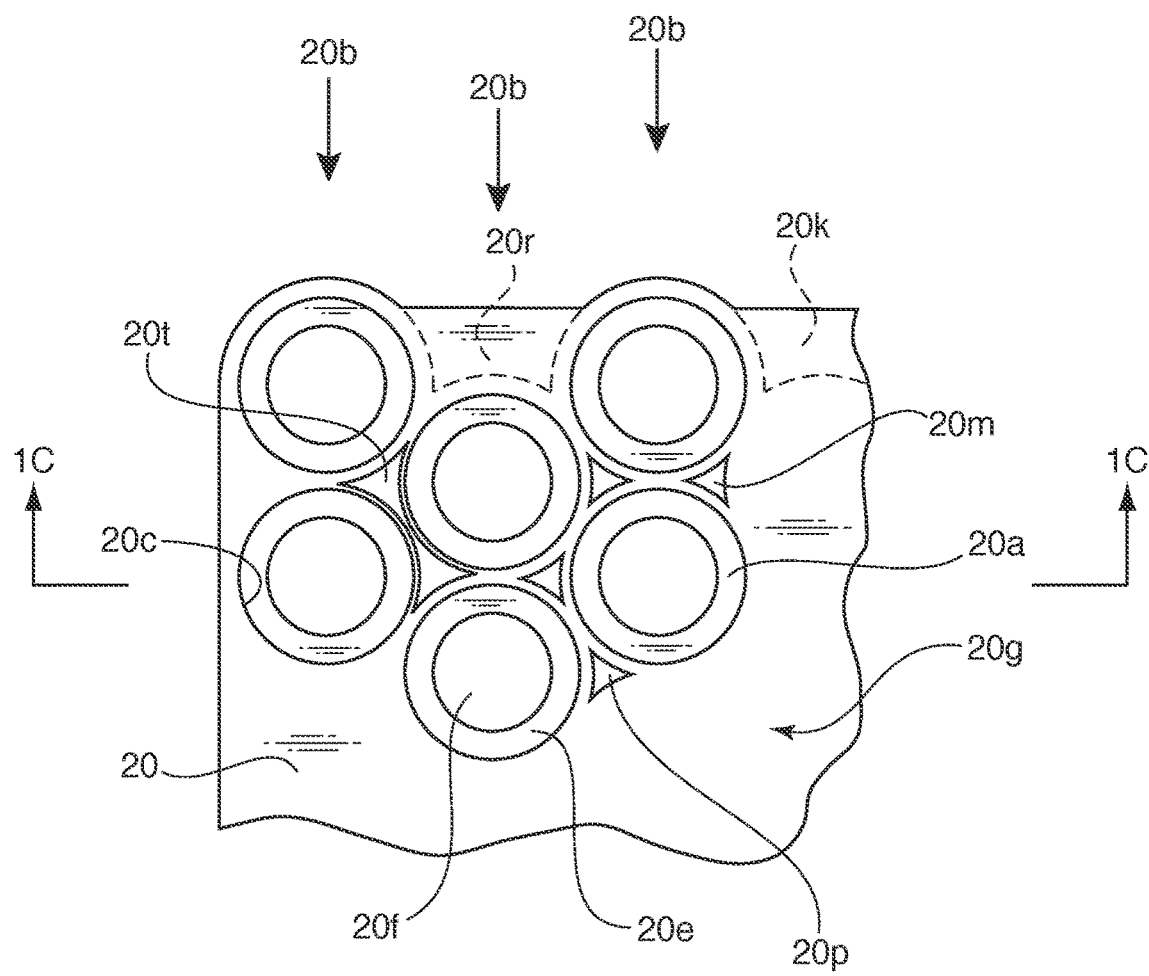
FIG. 1B is an enlarged, top plan view of a section of an end frame.
Figure 1C:
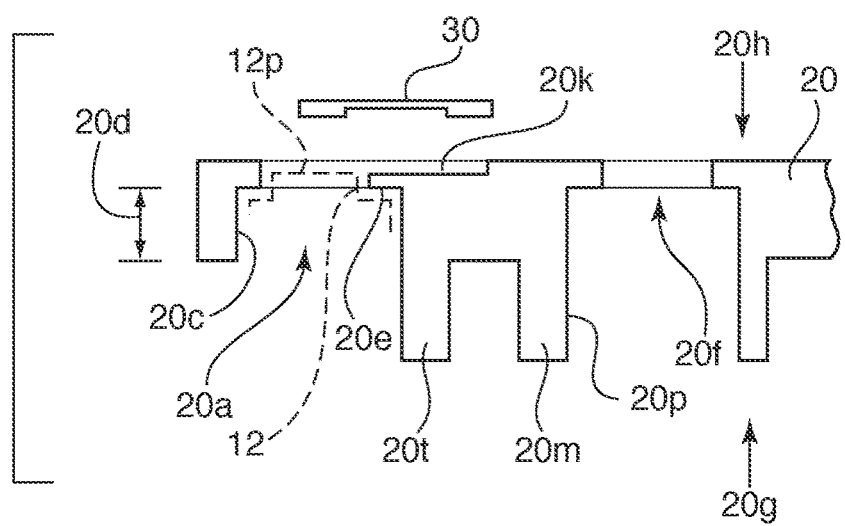
FIG. 1C is a cross-sectional view of the end frame section taken along the line 1C-1C from FIG. 1B.
Figure 2A:
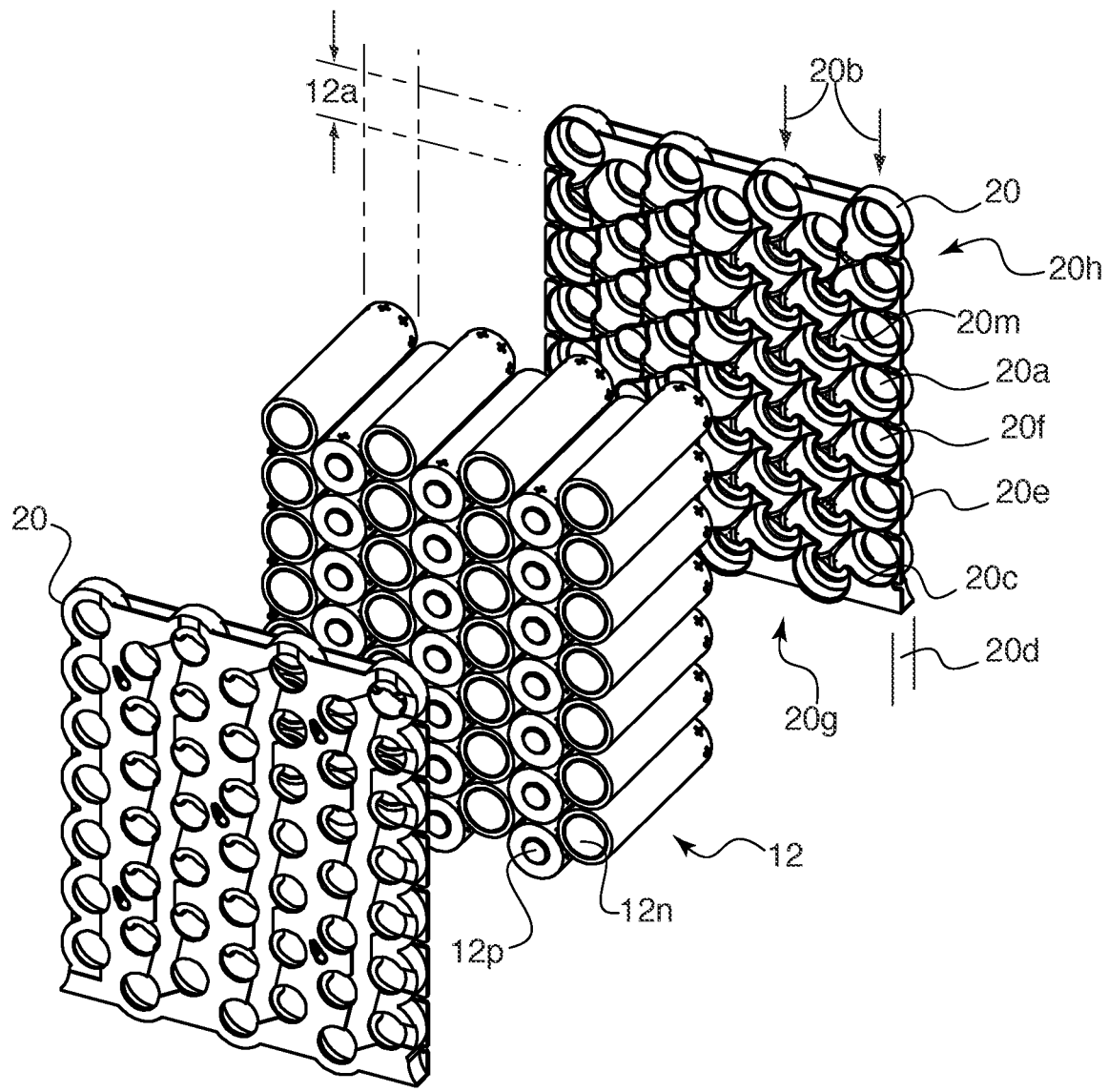
FIGS. 2A, 2B and 2C are exploded views of the cell packs.

Cells 12 are arranged within end frames 20 in rows 20b, as shown in FIGS. 1A, 1B and 1C. In each row the cells are places with alternating positive ends 12p and negative ends 12n facing one direction. Connecting tabs 30 are soldered to adjacent cells, connecting a positive end 12p to a negative end 12n, thereby forming a series connection for the cells within the cell pack 24. FIG. 1B shows an enlarged view of one corner of an internal side 20g of end frame 20. The cells have a diameter 12a, with cups 20a being configured slightly larger. A plurality of cups 20a are arranged in rows 20b, that are offset by one-half the cup diameter to create a honeycomb configuration of cells. Each cup 20a includes an annular ring 20c that is a vertical wall in the view of FIG. 1B. The annular ring height 20d is shown in FIGS. 1C and 2A. The lower part of annular ring 20c terminates in a bottom 20e having an aperture 20f formed therein. In between adjacent groups of three cups, there are posts 20m, which extend up, off the page, with tapered top ends to guide the cells into the cups during the press fitting operation. The posts do not have regular triangular cross-sections, rather the posts have three concave sides 20p that conform to the arc of the cups (and slightly larger that the circumference of the cells). At selected locations, the posts are formed between four adjacent cups as double triangles. These double triangular cross section posts 20t may by located in the corners, or in rows through the middle of an end frame to provide additional strength and stiffness to the end frame. FIG. 1B also shows slots 20r at the periphery of end frame 20, in the region where a row 20b is staggered downward.

Tabs 30 connect the cells. The tabs are designed with an offset to provide compliance to reduce stress on the weld joints that provide cell to cell connections. The tabs are shaped to self fixture and align themselves to the cells for improved assembly. The tabs that interconnect cells are configured to provide a series connection between cells while providing parallel connection between groups of cells. After welding, these tabs provide additional mechanical grid-locking support between the honeycomb and cells, further preventing these cells from coming loose from friction fit.

The cell packs are protected by thermal fuses 40. The thermal time constant of the fuses has been increased by the addition of a potting compound 40a around the fuses and onto the cells. This eliminates fuse operation due to thermal rise of the cells that is expected during normal periods of high amperage operation. The fuse will still operate to protect the battery during unexpected high current operation.

Figure 2B:
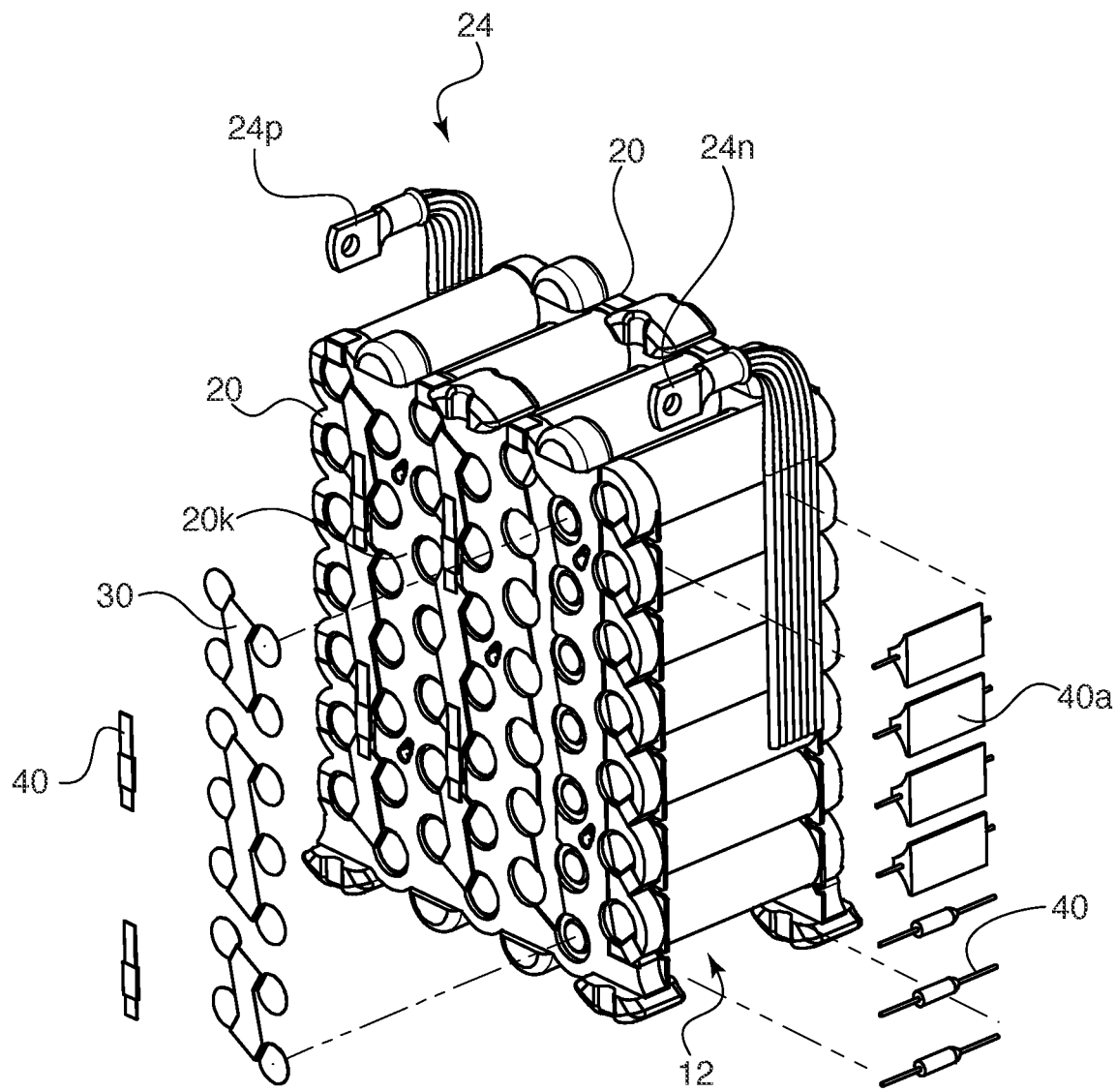

FIG. 2A shows a row of cells with the negative cell contact 12n facing up in one row, and the positive cell contact 12p facing up in the adjacent row. The cells are captured between two end frames 20. In FIGS. 1C and 2B show connecting tabs 30 extending from one aperture 20f to the next to connect cells. Connecting tab 30 sits within a shallow channel 20k formed in the external side 20h of each end frame 20.

As can be seen in FIGS. 2B, 2C, 3 and 4A a central negative bus bar 70 is connected to the negative terminal 24n of the cell packs and the output terminal 72 through a monitoring device. Being centrally located allows the length of this bus to be short to minimize the resistance and voltage drop. A ring bus 80 connects the positive terminal 24p of the cell packs to the output terminal through a switch 64. The cell pack arrangement that provides for a short negative bus necessitates a long current path in the positive bus. To balance resistance from the cell packs to the switch the bus is arranged in a ring to provide self balancing multiple current paths to the switch.

Figure 2C:
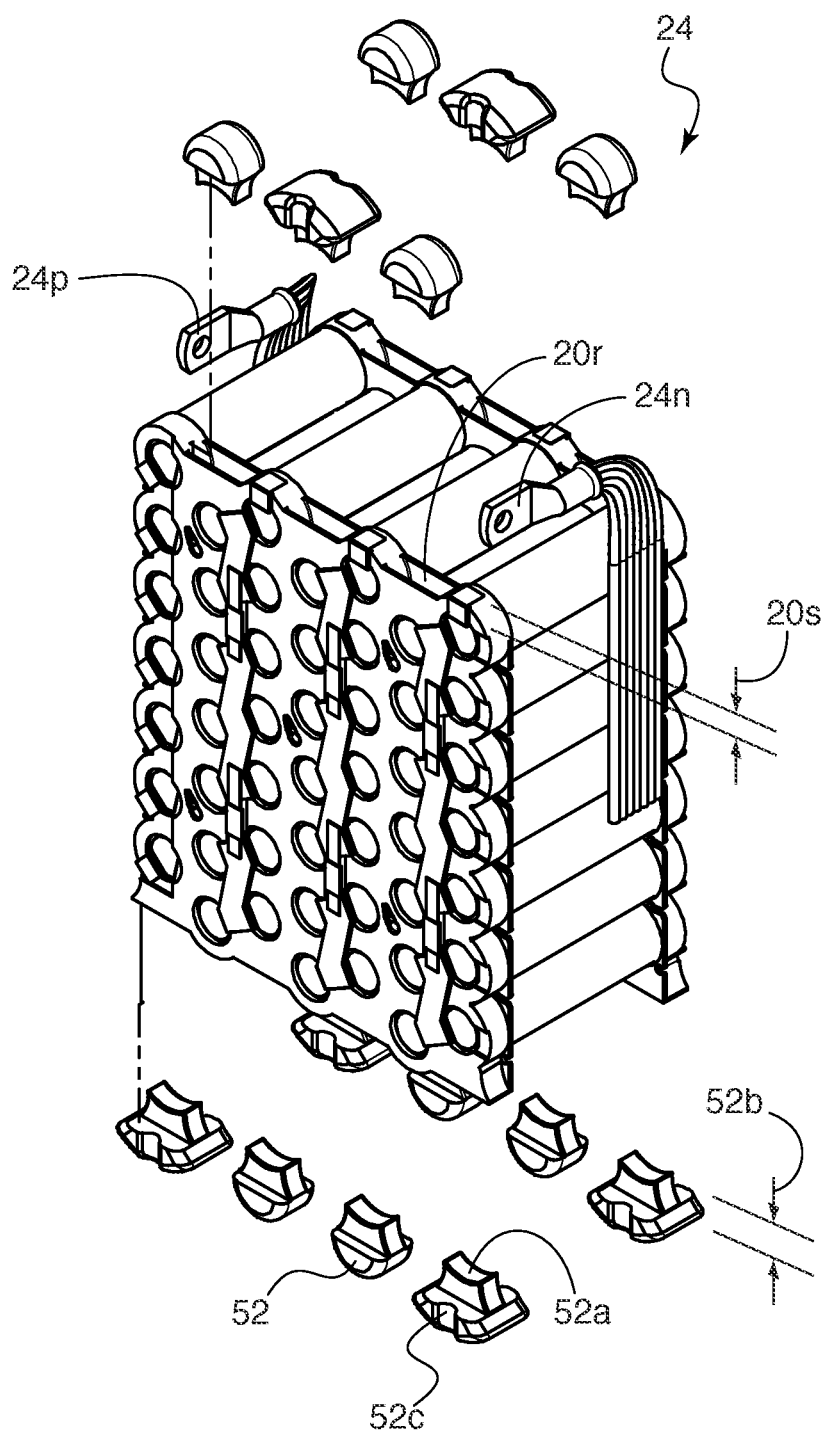
Figure 3:
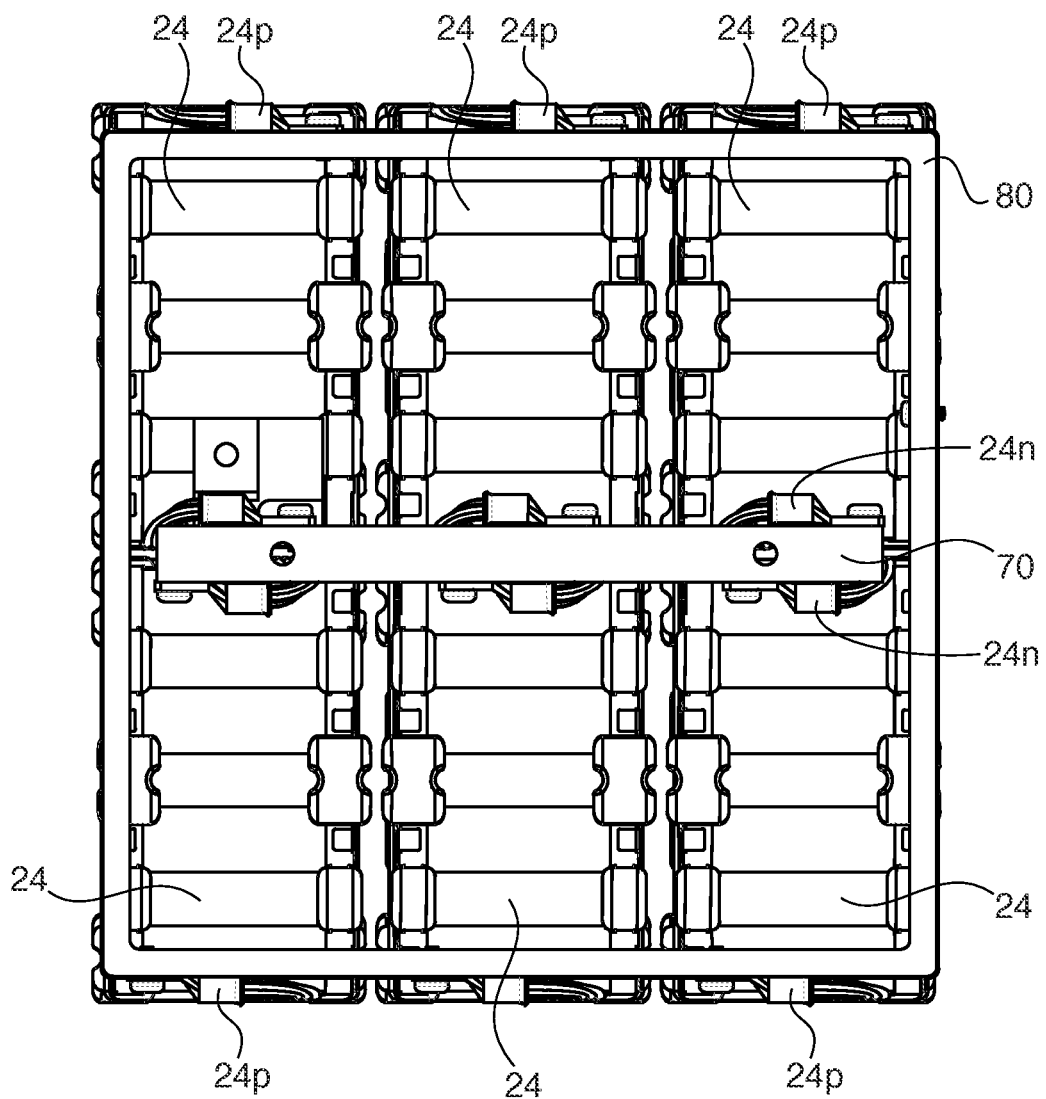
FIG. 3 is a top plan view of the bus bars and cell packs.

The bus bars, control electronics, and other circuitry are contained in and supported by a plastic tray 62 (FIG. 1A). The tray provides mechanical support and physical separation between components. The positive bus bar ring 80 is designed as a continuous rigid rib structure that fits into the tray perimeter and gives it additional structural support. This allows the tray to take random loads of all 6 packs acting on its otherwise very large surface area during vibration and drop with minimal deflection. The ring then passes this load to the very edge of the cover which is its stiffest section, as the perimeter of the cover 62 is shear bonded to the case, or battery housing 60. The cell packs are allowed to move on isolation mounts 52 to absorb shock and vibration to prevent damage to the cell packs. The cell packs are contained in separate five sided pockets 50 in the battery housing with the isolation mounts touching each side. FIG. 1B shows slots 20r located in the edges of end frames 20. FIG. 2C shows the isolation mounts 52 with tabs 52a having a height 52b slightly smaller than the height 20s of the slot 20r. Once installed, the foot of the lower isolation mount 52 extends out and laterally to contact the internal bottom and sides of the five-sided pocket 50 (FIG. 1A). The foot 52c of the upper isolation mount 52 extends out to contact the bottom of tray cover 62, and laterally to contact the internal side of five-sided pocket 50. The tray provides the top surface of the pockets to restrain the upper side of the cell pack shock and vibration isolators.

The output terminals 72, 82 are flat pads with internal threads. They can be converted to standard posts 74, 84. Anti rotation keying is provided in the posts which are held onto the flat pads through a screw though the center of the posts. The positive and negative posts are keyed differently to prevent installation of the wrong post onto the flat pads.

Previously the batteries exterior casing, or outer housing, was formed from plastic. A thermoplastic material for thermoset polymer could be molded to provide a unitary sealed housing of relatively high strength. For portable or field deployable batteries, a plastic housing provided a reasonable balance between strength and weight while enclosing the battery cells in a nonconductive sheath.

One drawback is that the plastic housing materials have a relatively low strength. A low strength housing is sufficient for stationary placement, for example, at an encampment. However, the plastic housing is not sufficiently robust for other more demanding environments. The plastic housing would be subject to overheating if it was used as an accessory battery for an internal combustion engine vehicle and placed in an engine compartment. The plastic housing would not withstand a low pressure environment that would be encountered in a plane. Finally, the plastic housing does not possess sufficient ballistics resistance if it was field deployed with a SWAT or Peacekeeping team into a conflict area or with a military detachment into a combat zone.

The primary advantage of the proposed approach is the metal material of the housing provides a ballistic resistant battery case. The case is completely sealed and waterproof. The negative bus bar functions as a reinforcing rib. Additionally, the negative bus bar maintains the front and back walls of the housing at fixed spacing to the parallel panels. The bolts and connectors secure a central portion of the cover to the studs and then to the panels, side walls and bottom of the housing. The vent holes and labels provide a first level of pressure relief. The edges of the cover extending parallel to the negative bus bar can pivot upwardly, while the central portion of the cover remains bolted to the studs. This provides a second level of pressure relief.

Figure 4A:
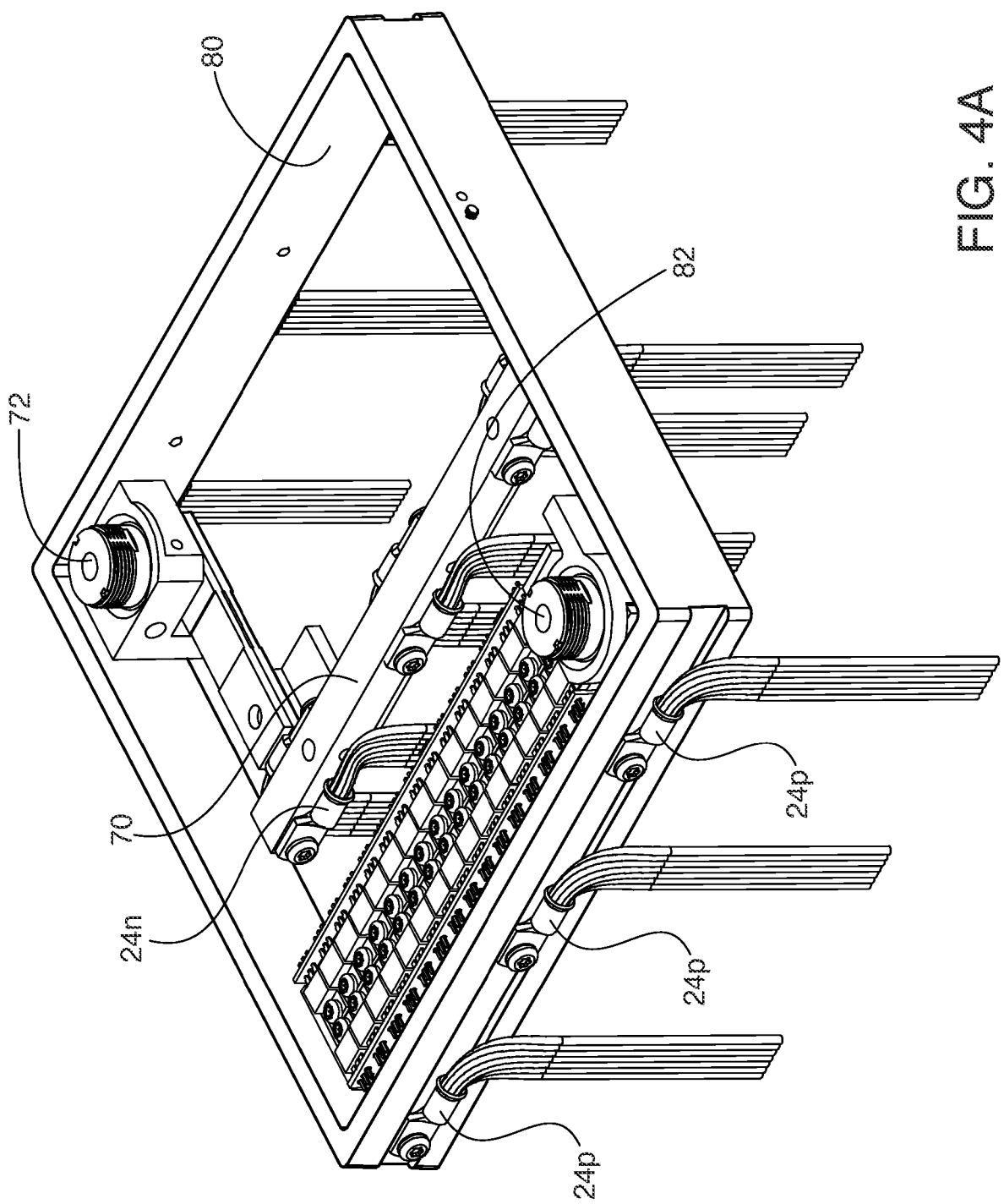
FIG. 4A is a perspective view of the bus bars without the cell packs.
Figure 4B:
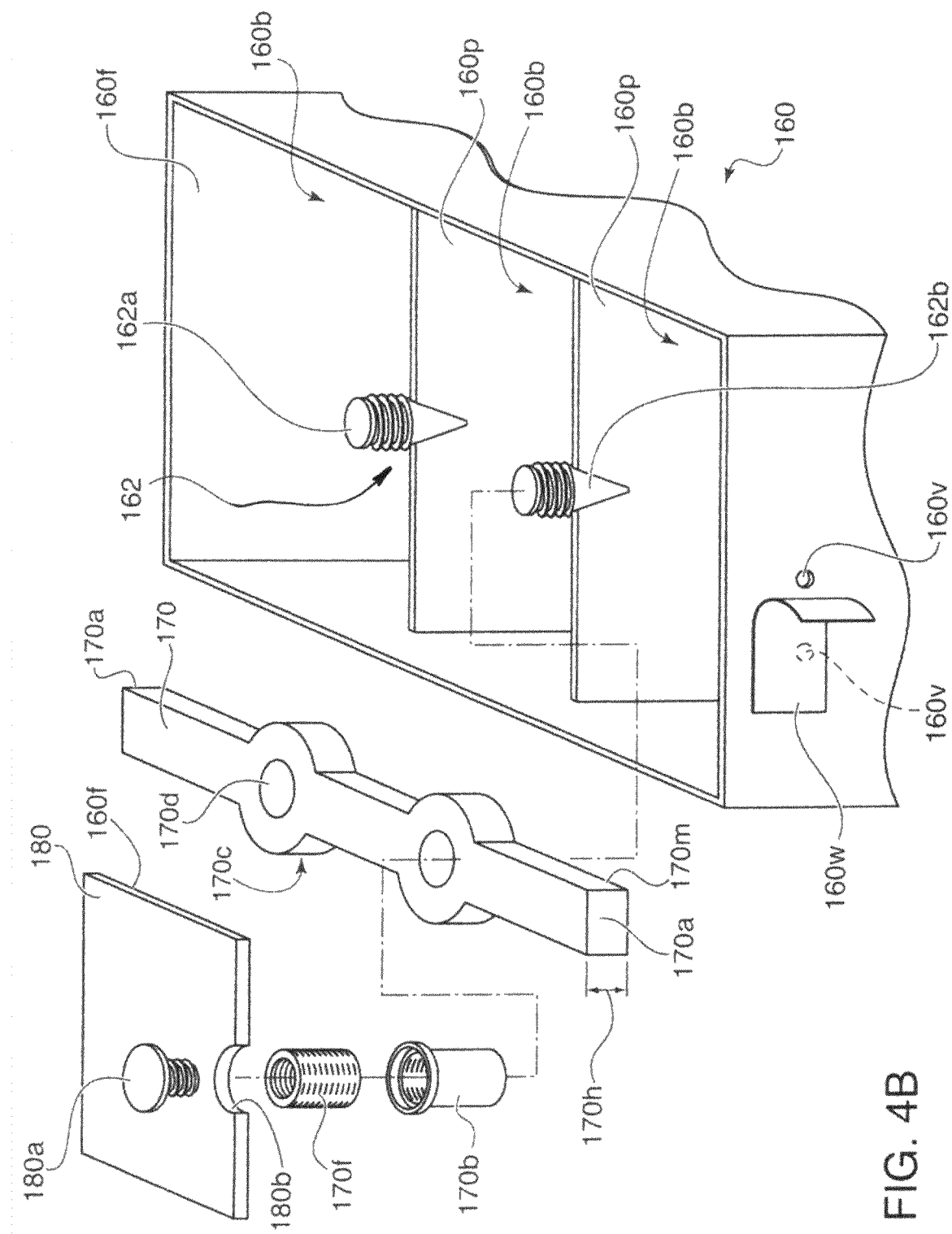
FIG. 4B is an exploded view of the negative bus bar assembly.

FIG. 4B is an exploded perspective view illustrating the structural components and connectors in a ballistic resistant battery case according to an aspect of the invention. A metal housing 160 is a five-sided rectangular box formed from bending and welding high temperature steel. One or more panels are disposed within the box. For example, two panels 160p are welded along three edges to the sides and bottom of the housing. The panels are spaced equidistantly across the length of the box to form two bays 160b of equal dimensions. An external cover 180 of high temperature steel is provided to as the sixth side of the box to form a watertight casing. All steel surfaces of the housing and cover are treated with Chemical Agent Resistant Coating (CARC) or by being galvanized. CARC is a highly-crosslinked non-porous coating that protects the metal from biological, radioactive and chemical contamination and withstands chemical cleaning and decontamination without corroding. CARC is applied as one or more layers of highly-crosslinked resins such as urethane, polyurethane, aliphatic polyurethane, epoxy, epoxy polyamide, epoxy polyamide enamel and combinations thereof. In addition all of the housing, cover and panel surfaces are lined with thermoplastic film 160f which serves as an insulator to prevent any of the battery leads, connectors or control electronics from shorting.

Steel is an unlikely choice for a battery casing since it presents serious threats in the form of electrocution, short circuiting, damage to battery cells and electronics, and fire and explosion hazards. To address these concerns the entire interior of the metal case and lid are lined with a thermoplastic film. The film maybe selected from materials such as polyester, nylon and polycarbonate. A suitable film would be between about 0.2-2.0 mm thick, more particularly 0.25-1 mm thick. A suitable film would posses a dielectric constant between about 250-350 kV/mm (or between about 6,250-8,750 V/mil). In a practical embodiment polyester film about 0.5 mm thick, sold under the tradename Mylar, was adhered to the interior of the case. The film is adhered to the interior surface of the case using a suitable adhesive, for example, 300 LSE manufactured by 3M.

The upper end of the panel 160p includes a threaded stud or bolt 162 extending upwardly. The stud is located about midway across the housing. The stud is secured to the panel. The stud includes a slotted lower portion 162b that receives the upper end of the panel. Portions of the stud on either side of the slot can then be spot welded to opposite sides of the panel. The stud also includes a threaded upper portion 162a. The cover 180 has apertures 180b aligned with the stud for threaded fasteners 180a to pass through and secure the cover to the studs 162.

One of the battery's bus bar 170, for example the negative bus bar, extends across the open top end of the housing, perpendicular to the panel 160p. Negative bus bar 170 has a height 170h. Height 170h is less than or equal to the difference in height between the side walls of housing 160 and panel 160p. Negative bus bar 170 includes ends 170a that sit flush with the front and back walls of housing 160. The negative bus bar includes cylindrical sections 170c with concentrically disposed holes 170d which accommodate the stud 162. A layer of insulating material 170m lines the bottom and ends 170a of the bus bar to prevent shorting to the panel or side walls. Insulating bushings 170b are disposed within hole 170d to prevent bolt 180a, female-female connector 170f and stud 162 from shorting to the bus bar. The negative bus bar is a reinforcing rib that prevents the panel from deflecting, maintains the panel and parallel housing sides at appropriate spacing and reinforces the cover. The bus bar is made primarily from aluminum and electrically couples all of the cell pack terminals of one polarity together. The bus bar is then electrically coupled to one of the output terminals 72, 82 located on the exterior of the case to connect a load. The bus bar has sufficient cross-sectional area in cylindrical sections 170c that surround the hole containing the threaded sleeve to conduct at least 80 amps along its length, with the corresponding heat being dissipated through contact to the cover.

External cover 180 is bolted to stud 162 through negative bus bar 170. The central portion of the cover that overlies the bus bar is robustly secured in place between the bolt head and the bus bar. The bolt is secured to the studs which is tied in to the panels, side walls and bottom of the housing. The periphery of the cover is sealed to the open top end of the case with glue. The edges of the cover parallel to the bus bar are designed to pivot upwardly breaking the glue seal to provide over-pressure protection venting that may occur upon ballistic impact. The central portion of the cover that is bolted to the studs of the panels remains in place. The left and right sides of the cover can pivot open like a door hinged at the central portion of the cover.

As an additional feature, the metal battery housing in combination with a thermally conductive filler reduces the cell pack temperature by decreasing the thermal impedance from the given cell pack volume to the outside surface of the metal battery housing.

The housing 160 includes vent holes 160v sealed with pressure sensitive labels 160w. The labels and/or pressure sensitive adhesive are designed to withstand gradual pressure changes if the battery is transported by air. The labels and/or pressure sensitive adhesive are designed to breach to provide over-pressure venting if runaway cells generate heat and pressure beyond the capacity of the thermally conductive filler. Accordingly, the combination of label material and adhesive strength will keep the vent holes closed during altitude changes up to 50,000 feet, when the atmospheric pressure varies between about 30 inHg and 3 inHg and back to 30 inHg. In addition, the combination of label material and adhesive strength will open the vent holes if the internal pressure approaches the design limits of the housing. The combination of label material and adhesive strength will keep the vent holes closed under 10× pressure changes, and will open the vent holes under 15× pressure changes. A pressure sensor may be provided to monitor internal pressure and coupled to software that will open circuit breakers to disconnect the bus bars under 15× pressure changes.

The case is made from high temperature steel of a sufficient thickness to absorb ballistic incursion and remain intact while damaged cells burn out and ignite neighboring cells in a domino effect and simultaneously prevent the cells or other internal battery components from ejecting as secondary projectiles. In this application, high temperature means a steel that can withstands temperatures up to about 500 degrees C. (930 degrees F.). Such steels contain base materials of nickel, iron or cobalt and combinations thereof. Nickel type materials will contain primarily nickel with lesser amounts of iron and cobalt, with the base materials collectively making up more than 50% of the alloy. Cobalt type materials will contain primarily cobalt with lesser amounts of nickel and iron, with the base materials collectively making up more than 50% of the alloy. Iron type materials will contain primarily iron with lesser amounts of nickel and cobalt, with the base materials collectively making up more than 50% of the alloy. Typically, chromium is added in an amount between 1-30%. Molybdenum is optionally added in amounts up to 28%. Other materials are optionally added in trace amounts up to 15%, namely, tungsten, manganese, silicon, niobium, aluminum, titanium, carbon, boron, zirconium and copper and combinations thereof.

In one test 7 mm armor piercing incendiary rounds are shot at a front and side walls of the battery case to determine the effect when cells are damaged. While flames are acceptable, the test requires that the case contain battery components from ejecting. The Li-Ion cells contain a large quantity of chemical energy and burn like a blow torch when damaged. The release of energy from multiple cells simultaneously can reach explosive levels. The temperature of burning cells can reach 1,000 degrees C. (1,830 degrees F.). Heat from the burning cells will initially be dissipated by the thermally conductive filler. Next the labels will burn off to relieve pressure from the case preventing it from bursting. Explosive pressure will deflect the sides of the cover to provide larger openings at the top of the case. The case will remain intact while the damaged cells burn out and ignite neighboring cells in a domino effect. The key function of the case is to prevent the cells or other internal battery components from ejecting as secondary projectiles.

Figure 4C:
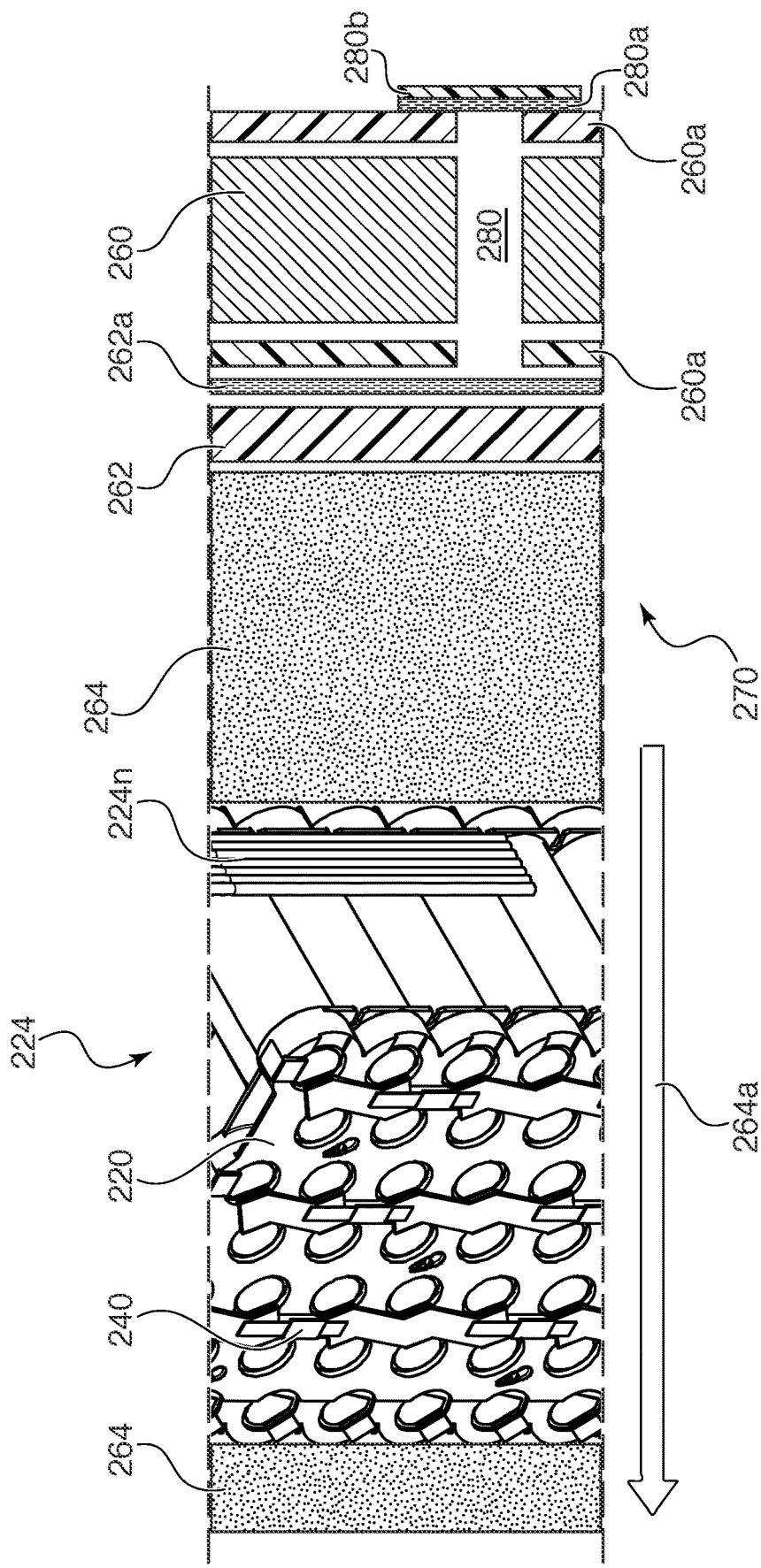
FIG. 4C is a cross-sectional view of the case, insulation and thermal filler of the thermal management system.

FIG. 4C is a cross-sectional view illustrating an embodiment of a thermal management system 270. The steel casing 260 forms the exterior of the battery. CARC or galvanization 260a is applied to both interior and exterior surfaces of steel casing 260. CARC coating would be intimately bonded to the surface of the casing, a small gap is included in the drawing the sake of clarity. An insulating film 262 is adhered to interior surface of the casing with adhesive 262a. A cell pack 224 is shown with its negative terminal 224n and thermal fuses 240. A sleeve may be provided around cell pack 224, although not illustrated for the sake of clarity. An alternate vent 280 is shown in FIG. 4C as an aperture through the metal case 260. One or both sides of the aperture may be covered with a film 262, 280b attached to the case with adhesive 262a, 280a.

A thermally conductive filler 264 is disposed within the case to fill the free space between cell pack 224 and insulating liner 262. Additional thermally conductive filler 264 occupies all of the interstices between the individual cells of cell pack 224 as indicated by the filling arrow 264a. The thermally conductive filler is chemically inert and possesses arc resistance. The thermally conductive filler has a fine granular consistency, for example, granules having a median particle size between 2.0 and 200 microns. A suitable filler will possess a thermal conductivity between about 10-35 W/m·° K (or about 70-240 BTU·in/ft²·hr·° F.). In addition, a suitable filler will possess a dielectric strength between about 10 and 20 kV/mm (or about 250-500 V/mil).

In a practical embodiment alumina trihydrate ($Al_2O_3 \cdot 3H_2O$) having a median particle size of 80 microns was introduced into the free space within the battery. The battery was vibrated to allow the granules to settle into any of the smaller spaces and then topped off with additional granules until the desired level of packing was achieved. As described above 48 or 49 cylindrical cells are arranged within two end frames in a honeycomb configuration to form each cell pack. The thermally conductive filler then occupies the gaps in between the honeycombed configured cells. Alumina Trihydrate endothermically decomposes at 220 degrees C. (430 degrees F.) to release 35% of its weight as water vapor; wherein excessive water vapor pressure will breach the pressure relief vent.

A further advantage of the proposed approach is the ability to continuously charge and discharge the battery at significantly higher rates at elevated ambient temperatures. Additionally the reduced cell temperature provides an increase in battery cycle life. The thermal management system can be applied to any battery having a cell pack contained in a battery housing in order to improve high-rate high-temperature performance. As a specific example, the thermal management system has been applied to a 6T battery. Previously the internal space of the battery was air cooled and housed in a polypropylene case. Maximum cycling performance was rated at +60 amps charging and −60 amps discharging at an ambient temperature of 38° C. Utilizing the thermal filler and metal case according to the thermal management system of the invention, the battery can be continuously cycled at greater than 80 amps, for example, +90 amps charging and −90 amps discharging at an ambient temperature of 50° C., providing a significant improvement in performance capability.

Having described preferred embodiments (which are intended to be illustrative and not limiting) for materials, configurations and assembly, it is noted that modifications and variations can be made by persons skilled in the art in light of the above teachings. The case, bus bar and connector may be configured and assembled in various forms to achieve the same ballistic resistance. The metals, coatings and fillers may be selected from equivalent materials to provide similar physical properties to protect the cell packs and provide damage protection. The secondary battery may contain different quantities of individual cells along with additional receiving bays and corresponding cell packs. It is therefore to be understood that changes may be made in the particular embodiments of the invention disclosed which are within the scope and spirit of the invention.

What is claimed is:

1. A ballistic resistant case for a secondary battery comprising:
   a rectangular metal case having: a front wall and two side walls and a rear wall extending up from a bottom wall; a panel connected to said bottom wall and the side walls to divide the internal space of the case into cell pack receiving bays; and a cover to seal the cell pack receiving bays;
   a bus bar contacting the front wall and extending from the front wall, across the top of the panel, to contact the rear wall; and
   a connector extending through the bus bar to secure the cover to the panel with the bus bar sandwiched therebetween, wherein the bus bar is electrically insulated from the connector and the cover and the panel, whereby the bus bar reinforces a central portion of the cover and prevents the panel and the walls from deflecting to provide ballistic protection for the cell pack receiving bays.

2. The ballistic resistant case according to claim 1, wherein the connector includes one or more bolts and threaded sleeves that extend through a hole formed in the bus bar, and wherein the panel is shorter than the walls by a distance that is about the height of the bus bar, and wherein the bus bar includes a front and rear surface which contact with the front and rear walls, respectively.

3. A ballistic resistant case for a secondary battery comprising:
   a rectangular metal case having: a front wall and two side walls and a rear wall extending up from a bottom wall; a panel connected to said bottom wall and the side walls to divide the internal space of the case into cell pack receiving bays; and a cover to seal the cell pack receiving bays;
   a bus bar made primarily from aluminum extending from the front wall, across the top of the panel, to the rear wall;
   a connector to secure the cover to the panel with the bus bar sandwiched therebetween, whereby the bus bar reinforces a central portion of the cover and prevents the panel and the walls from deflecting to provide ballistic protection for the cell pack receiving bays; wherein the connector includes one or more bolts and threaded sleeves that extend through a hole formed in the bus bar, and wherein the panel is shorter than the walls by a distance that is about the height of the bus bar, and wherein the bus bar includes a front and rear surface which contact with the front and rear walls, respectively; and
   cell packs with positive and negative terminals, wherein the bus bar electrically couples all of the cell pack terminals of one polarity together, wherein the bus bar has sufficient cross-sectional area around the hole containing the threaded sleeve to conduct at least 80 amps along its length, with the corresponding heat being dissipated through contact to the cover.

4. The ballistic resistant case according to claim 2, wherein the connector includes: a stud having an upper threaded portion and a lower portion fixedly mounted at a central point along the top of the panel; and an insulating bushing disposed within the bus bar hole to prevent shorting between the bus bar and any portion of the connector.

5. The ballistic resistant case according to claim 3, wherein the metal case is made from one of iron/carbon steel and high temperature steel, wherein all surfaces of the case are galvanized for rust prevention.

6. The ballistic resistant case according to claim 1, wherein the metal case is made from one of iron/carbon steel and high temperature steel, wherein all surfaces of the case are provided with a highly-crosslinked non-porous coating that protects the metal from biological, radioactive and chemical contamination and withstands chemical cleaning and decontamination without corroding.

7. The ballistic resistant case according to claim 6, wherein the highly-crosslinked non-porous coating comprises one of urethane, polyurethane, aliphatic polyurethane, epoxy, epoxy polyamide, epoxy polyamide enamel and combinations thereof.

8. The ballistic resistant case according to claim 1, further including cell packs with positive and negative terminals, wherein all of the surfaces facing the cell pack receiving bays are lined with an electrically insulating material which serves to prevent any of the cell packs, terminals or bus bar from shorting to the metal case.

9. The ballistic resistant case according to claim 8, wherein the electrically insulating material comprises a thermoplastic film adhered to the surfaces, and wherein the metal case is made from high temperature steel which withstands temperatures up to about 930 degrees F. containing a majority of nickel, iron, cobalt and combinations thereof.

10. The ballistic resistant case according to claim 9, wherein the thermoplastic film is one of polyester, nylon and polycarbonate having a thickness between 0.2 and 2.0 mm thick.

11. A ballistic resistant case for a secondary battery comprising:
   a rectangular metal case having: a front wall and two side walls and a rear wall extending up from a bottom wall; a panel connected to said bottom wall and the side walls to divide the internal space of the case into cell pack receiving bays; and a cover to seal the cell pack receiving bays;
   a bus bar extending from the front wall, across the top of the panel, to the rear wall; and
   a connector to secure the cover to the panel with the bus bar sandwiched therebetween, whereby the bus bar reinforces a central portion of the cover and prevents the panel and the walls from deflecting to provide ballistic protection for the cell pack receiving bays;
   wherein the cover is sealed to the top end of the walls with glue to provide a waterproof case that protects the cell pack receiving bays from moisture intrusion, wherein the case includes a pressure relief vent, and wherein side portions of the cover parallel to the bus bar are adapted to pivot upwardly breaking the glue seal to provide over-pressure protection venting following a ballistic impact.

12. The ballistic resistant case according to claim 11, wherein the pressure relief vent includes a vent hole formed in the case with a label adhered over the vent; wherein the adhered label can withstand up to 10 times variation in atmospheric pressure as encountered during altitude changes up to 50,000 feet and will rupture at greater than 10 times atmospheric pressure; and wherein a pressure sensor monitors internal pressure and is coupled to software to open circuit breakers and disconnect the bus bars at greater than 10 times atmospheric pressure.

13. The ballistic resistant case according to claim 9, further including cell packs disposed within the cell pack receiving bays, wherein each cell pack includes individual cells arranged within end frames, and wherein the case further including a thermally conductive filler material occupying the interstices between the individual cells and between the cell pack and the thermoplastic film lining, wherein the thermally conductive filler material decreases the thermal impedance from the cell pack to the outside surface of the metal case to reduce a cell pack temperature and increase battery life.

14. The ballistic resistant case according to claim 13, further including: tabs extending outwardly from the end frames to space the cell packs from the case; and a silicon-based shock absorbing material selectively disposed between the end frames and the metal case to stabilize the cell packs.

15. The ballistic resistant case according to claim 12, wherein the thermally conductive filler is granular with a particle size between 2 microns to 200 microns, wherein the filler is Alumina Trihydrate which endothermically decomposes at 430 degrees F. to release 35% of its weight as water vapor; wherein excessive water vapor pressure will breach the pressure relief vent.

16. The ballistic resistant case according to claim 1, further comprising a plurality of battery cells, wherein the case is made from high temperature steel of a sufficient thickness to absorb ballistic incursion and adapted to remain intact while damaged cells burn out and ignite neighboring cells in a domino effect and simultaneously prevent the cells or other internal battery components from ejecting as secondary projectiles.

17. The ballistic resistant case according to claim 1, further including: a plurality of battery cells arranged within end frames; and a shock absorbing material selectively disposed between the end frames and the metal case to stabilize the cell packs.

18. The ballistic resistant case according to claim 17, wherein the connector includes: a stud having an upper threaded portion extending through the bus bar and a lower portion fixedly mounted to the top of the panel.

19. The ballistic resistant case according to claim 18, wherein the case and cover are made from steel and are provided with a non-porous coating that protects the metal from biological, radioactive and chemical contamination and withstands chemical cleaning and decontamination without corroding; wherein the case and cover are lined with an electrically insulating thermoplastic material.

20. The ballistic resistant case according to claim 19, wherein cover is sealed to the top end of the walls with glue to provide a waterproof case and wherein side portions of the cover parallel to the bus bar are adapted to pivot upwardly breaking the glue seal to provide over-pressure protection venting following a ballistic impact.

* * * * *